United States Patent
Park et al.

(10) Patent No.: US 7,543,314 B2
(45) Date of Patent: Jun. 2, 2009

(54) OPTICAL DISC DRIVE HAVING IMPACT ABSORBING MEMBER

(75) Inventors: Chan-Bum Park, Seoul (KR);
Tae-Myun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 11/268,522

(22) Filed: Nov. 8, 2005

(65) Prior Publication Data
US 2006/0168600 A1 Jul. 27, 2006

(30) Foreign Application Priority Data
Jan. 27, 2005 (KR) .................... 10-2005-0007358

(51) Int. Cl.
G11B 33/08 (2006.01)
G11B 25/04 (2006.01)

(52) U.S. Cl. .................. 720/692; 720/651; 720/601

(58) Field of Classification Search ......... 720/601–616, 720/651, 692
See application file for complete search history.

(56) References Cited

U.S. PATENT DOCUMENTS 5,608,705 A * 3/1997 Tanaka .................. 720/605
6,252,839 B1 6/2001 Huang
6,704,266 B2 * 3/2004 Yanagiguchi ............. 720/635
6,859,935 B2 * 2/2005 Kume ..................... 720/694
7,013,474 B2 * 3/2006 Ito et al. .................. 720/692
2002/0110072 A1 * 8/2002 Yanagiguchi ............ 369/75.2
2003/0142611 A1 * 7/2003 Kume ..................... 369/75.2
2003/0193874 A1 10/2003 Ariyoshi et al.
2004/0205798 A1 * 10/2004 Azai ....................... 720/700
2005/0005280 A1 * 1/2005 You ........................ 720/659

FOREIGN PATENT DOCUMENTS

| EP | 0 860 832 | | 8/1998 |
| EP | 1 416 482 | | 5/2004 |
| JP | 09027180 A | * | 1/1997 |
| JP | 10208357 A | * | 8/1998 |
| JP | 11-003582 | | 1/1999 |
| JP | 2002-163882 | | 6/2002 |
| JP | 2003223776 A | * | 8/2003 |
| JP | 2004206813 A | * | 7/2004 |
| KR | 2001-020167 | | 3/2001 |
| KR | 2001-0055852 | | 7/2001 |

* cited by examiner

*Primary Examiner*—William J Klimowicz
(74) *Attorney, Agent, or Firm*—Roylance, Abrams, Berdo & Goodman, L.L.P.

(57) ABSTRACT

An optical disc drive includes a main chassis, a deck unit mounted on the main chassis to move upward and downward, and a slider installed movably on the main chassis. The slider moves the deck unit upward and downward while moving on the main chassis and an impact absorbing member, interposed between the slider and the deck unit, absorbs an impact transmitted to the deck unit.

14 Claims, 5 Drawing Sheets ered using a pickup unit of the non-contact type. However, the optical disc drive using the pickup unit also has drawbacks such as susceptibility to vibration or impact.
OPTICAL DISC DRIVE HAVING IMPACT ABSORBING MEMBER

CROSS-REFERENCE TO RELATED APPLICATIONS

This application claims benefit under 35 U.S.C. § 119 from Korean Patent Application No. 2005-7358 filed on Jan. 27, 2005, the entire disclosure of which is hereby incorporated by reference.

BACKGROUND OF THE INVENTION

1. Field of the Invention

The present invention relates generally to an optical disc drive. More particularly, the present invention relates to an optical disc drive having an impact absorbing member.

2. Description of the Related Art

In general, an optical disc drive selectively records and/or reproduces information in an optical recording medium such as a bare compact disc (CD) or a digital video disc (DVD). Typically, such optical disc drives are excellent in a repeated reproduction capacity of data because information is recorded or reproduced using a pickup unit of the non-contact type. However, the optical disc drive using the pickup unit also has drawbacks such as susceptibility to vibration or impact.

Moreover, in more recent optical disc drives, as the disc rotates at high speeds, inhibition or prevention of vibration caused by high speed rotations thereof is increasingly important.

A conventional optical disc drive to which a typical damping device is applied is schematically shown in FIG. 1.

As shown in FIG. 1, a typical optical disc drive includes a main chassis 10 and a pickup deck 20 is mounted on the main chassis 10 in such a manner that the pickup deck 20 may move upward and downward. The pickup device 20 includes a turntable 21 on which a disc is placed and a pickup 22 for selectively recording and/or reproducing information while moving in a radial direction of the disc placed on the turntable 21. A disc tray 30 is mounted on the main chassis 10 to slide in and out of the optical disc drive. A damping device 40 is placed between the pickup deck 20 and the main chassis 10 to prevent vibration due to disturbances and noise caused by internal vibration resulting from the driving of an eccentric disc.

The damping device 40 includes three rubber dampers 41, 42 and 43 installed at both sides of a front portion and at the center of a rear portion of the pickup deck 20, respectively.

The rubber dampers 41, 42 and 43 perform a buffering function between the pickup deck 20 and the main chassis 10. Thus, vibration caused by the disturbance is not transmitted to the pickup deck 20. Internal vibrations produced while the eccentric disc is driven are also not transmitted to the periphery. Accordingly, errors may be prevented when the information is recorded or reproduced through the optical disc drive.

However, conventional damping devices as described above may have the following problems: (1) the use of three rubber dampers 41, 42 and 43 increases material costs; and (2) the pollution of adjacent, for example, a DC motor 23 for driving the pickup 22 may be contaminated by a contaminant such as sulfur generated from the rubber dampers and result in a failure thereof.

Moreover, when the optical disc drive apparatus receives a relatively strong impact, for example, when the optical disc drive apparatus is dropped, the rubber dampers 41, 42 and 43 may not totally absorb impact. In this case, the pickup deck 20 may bend, thus, preventing the disc drive from being driven.

Accordingly, there is a need for an improved optical disc drive having improved impact resistance, lower material costs, and which prevents contamination of adjacent parts.

SUMMARY OF THE INVENTION

An aspect of the present invention is to address at least the above problems and/or disadvantages and to provide at least the advantages described below. Accordingly, an aspect of the present invention is to provide an optical disc drive having improved impact resistance.

Another aspect of the present invention is to provide an optical disc drive which may reduce material costs by decreasing the number of structural components and may prevent contamination of adjacent parts due to impurities such as sulfur by reducing the amount of rubber utilized.

The foregoing objects of the exemplary embodiments of the present invention are attained by providing an optical disc drive including a main chassis, a deck unit arranged on the main chassis which moves upward and downward, and a slider mounted movably on the main chassis. The slider moves the deck unit upward and downward while moving on the main chassis and an impact absorbing member placed between the slider and the deck unit absorbs an impact transferred to the deck unit According to one embodiment of the present invention, the deck unit may include a pickup deck including a turntable on which a disc is placed and moved in a radial direction of the disc. Moreover, a sub chassis may be formed in a front portion of the pickup deck and may include the impact absorbing member in a front portion of the sub chassis. The impact absorbing member may be integrally formed with the sub chassis. An impact absorbing slot is respectively formed in both sidewalls of the impact absorbing member. At least one stiffening rib which reinforces rigidity may be formed in a lower portion of the impact absorbing member.

At least one cam slot may be formed in the slider, and at least one cam protrusion corresponding to the cam slot may be formed in a front portion of the impact absorbing member such that the deck unit is movable upward and downward, with the deck unit interlocking with the slider. The optical disc drive further comprises a disc tray mounted on the main chassis to slide in an out of the optical disc drive. The slider moves on the mains chassis with interlocking relation with the disc tray.

The optical disc drive according to embodiments of the present invention may further comprise a damping device which absorbs vibrations caused between the main chassis and the pickup deck. The damping device includes a pair of mold tension portions integrally formed with both sidewalls of the main chassis. A pair of mold tension guide portions protrudes from both sides of a front portion of the sub chassis such that the mold tension guide portions are placed and supported in the bottom of the mold tension portions. One rubber damper is mounted at the center of the rear portion of the pickup deck.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
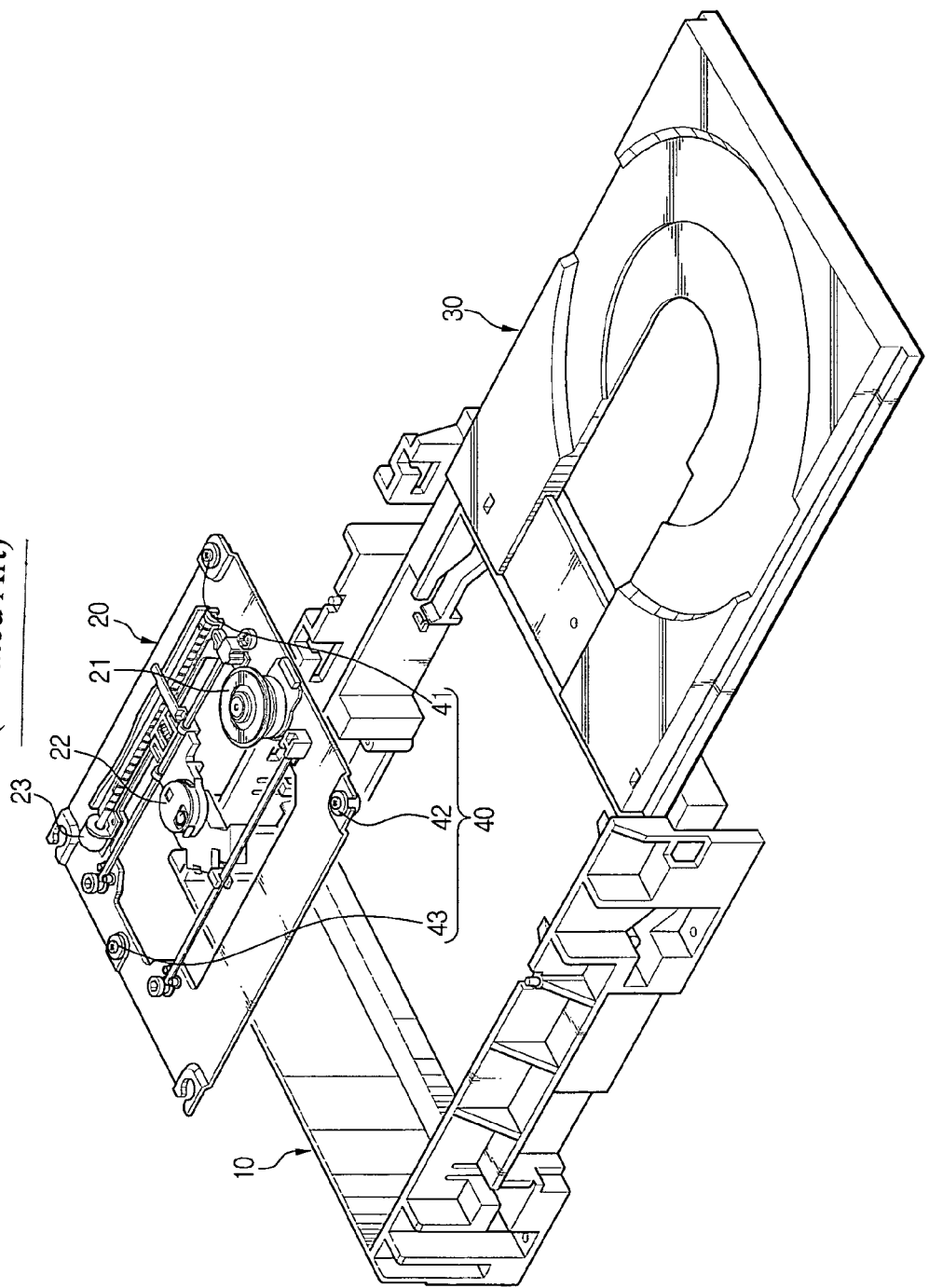
FIG. 1 is an exploded perspective view of a conventional optical disc drive.
Figure 2A:
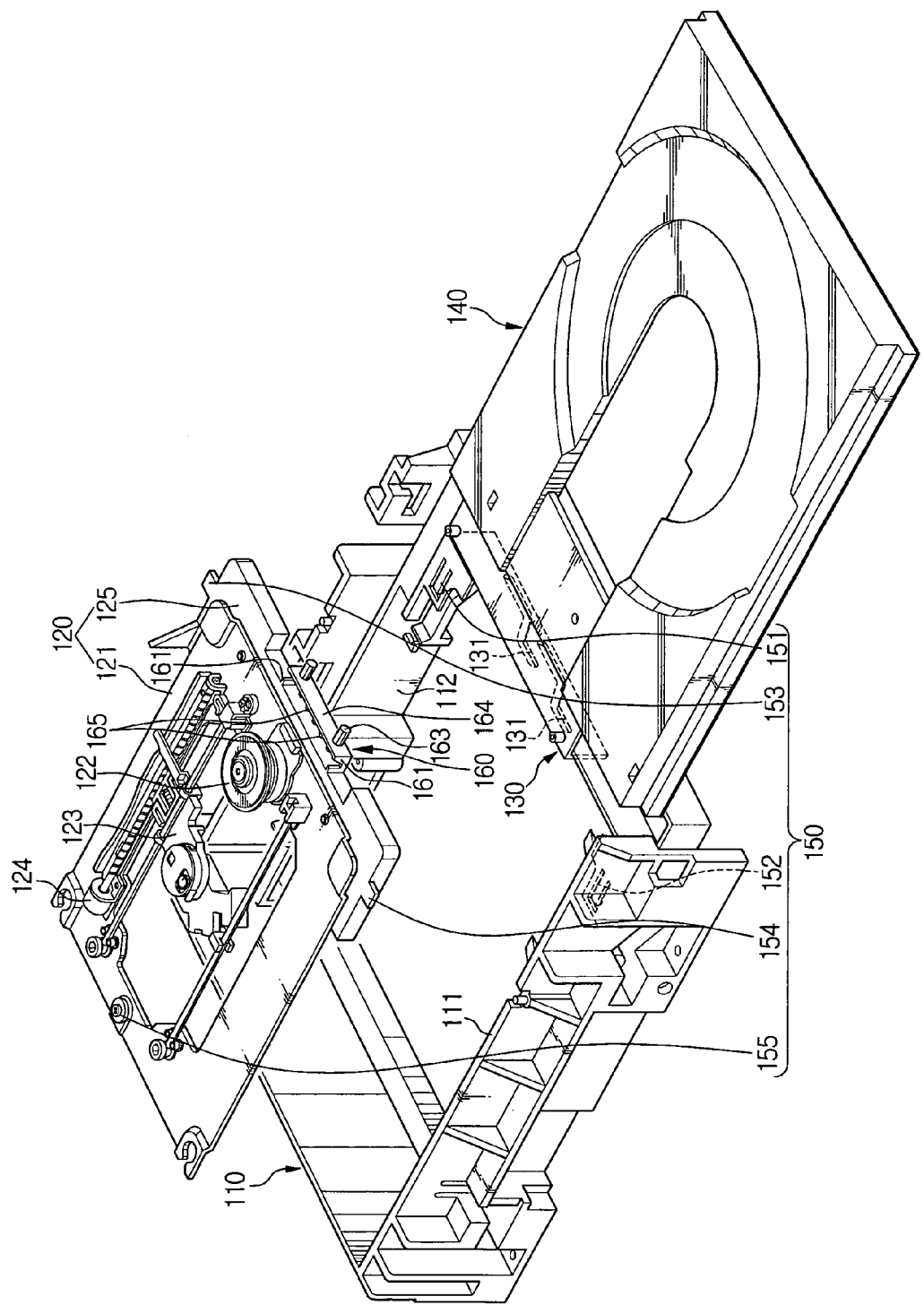
FIG. 2A is an exploded perspective view of an optical disc drive according to one embodiment of the present invention.
Figure 2B:
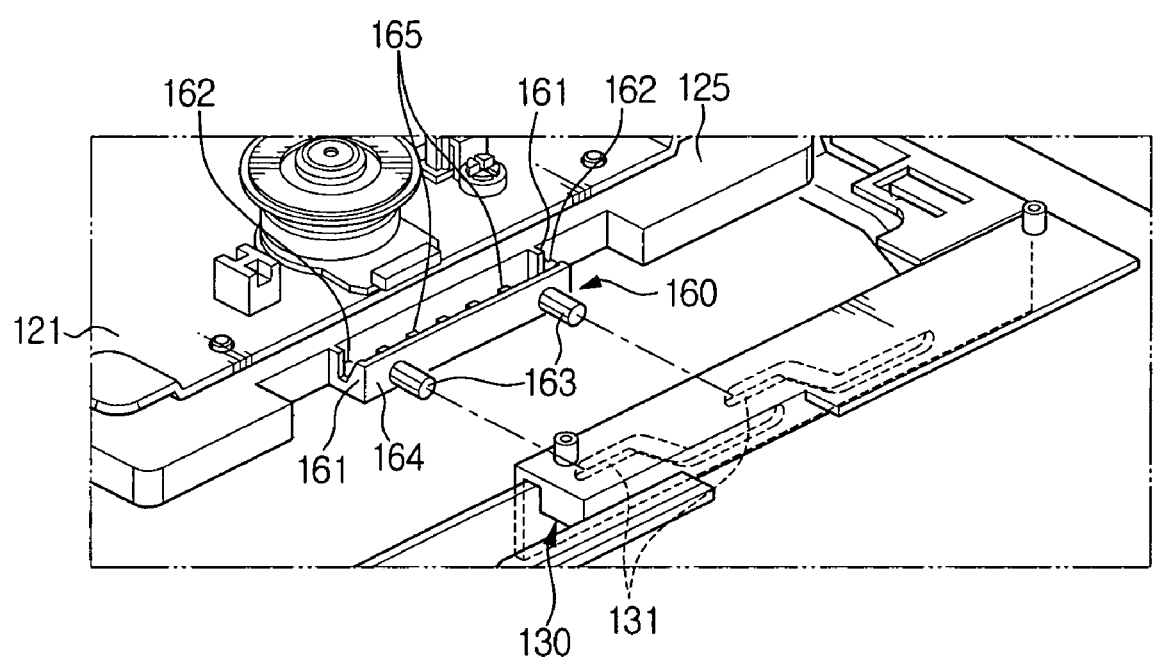
FIG. 2B is a detailed view of the slider and impact absorbing member portions of FIG. 2A.
Figure 3:
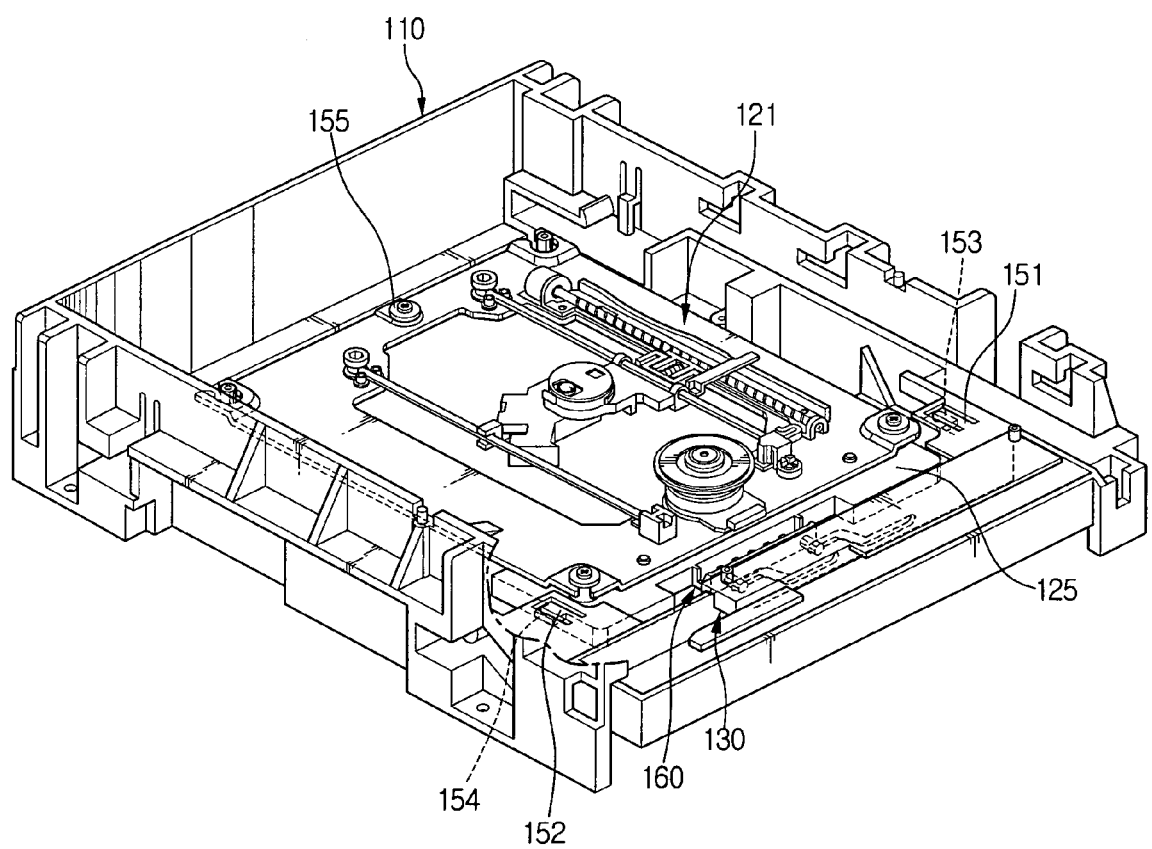
FIG. 3 is a perspective view of an assembled state of the optical disc drive shown in FIG. 2A.

FIG. 2A is an exploded perspective view schematically showing an optical disc drive according to one embodiment of the present invention, and FIG. 2B is a detailed view showing the slider 130 and the impact absorbing member 160 of FIG. 2A. FIG. 3 is a perspective view of an assembled state of the optical disc drive shown in FIG. 2A.

Referring to FIG. 2A to FIG. 3, an optical disc drive according to one embodiment of the present invention includes a main chassis 110, a deck unit 120 mounted on the main chassis 110 to move upward and downward, a slider 130 which moves the deck unit 120 upward and downward while moving on the main chassis 110, and a disc tray 140. A disc may be arranged on the disc tray 140 which is mounted on the main chassis 110 to slide in and out of the main chassis 110. A damping device 150 inhibits vibrations produced between the main chassis 110 and the deck unit 120. An impact absorbing member 160 is interposed between the deck unit 120 and the slider 130.

The main chassis 110 has sidewalls 111 and 112, and is coupled with the deck unit 120, the slider 130 and disc tray 140.

The deck unit 120 includes a pickup deck 121 and a sub chassis 125.

The pickup deck 121 includes a turntable 122 on which a disc is placed. A pickup 123 records and/or reproduces information while moving in a radial direction of the rotating disc placed on the turntable 122. A DC motor 124 of the drive source drives the pickup 123. The pickup deck 121 is mounted on the main chassis 110 movably upward and downward wherein an upper position of pickup deck 121 can be achieved via a chucking position of a disc.

The sub chassis 125 is fixed on a front portion of the pickup deck 121 and thereby the sub chassis 125 moves upward and downward with pickup deck 121. An impact absorbing member 160, which will be described later, is provided on a front portion of the sub chassis 125.

The slider 130 is mounted on the main chassis 110 such that the slider 130 may move in the right and left directions. The slider 130 moves in interlocking relation with the disc tray 140 in the right and left directions on the main chassis 110. The slider 130 has two cam slots 131 formed therein, and the cam protrusions 163 are formed on an impact absorbing member 160 which will be described later. The protrusions 163 are inserted into the cam slots 131. In this structure, when the slider 130 moves in the right or left direction, the cam protrusions 163 move along the cam slots 131. Additionally, the slider 130 moves the sub chassis 125 and the pickup deck 121 upward or downward.

The disc tray 140 is mounted on the main chassis 110 to slide in and out of the main chassis 110. The disc is loaded into or unloaded from the interior to the main chassis 110 by the disc tray 140. The disc tray 140 moves slider 130 in the right or left direction while the disc tray 140 is loaded into or unloaded from the interior of the main chassis 110. The movement of the slider 130 in the right or left direction moves the sub chassis 125 and the pickup deck 121 upward or downward, thereby chucking or unchucking the disc.

The damping device 150 is interposed between the pickup deck 121 and the main chassis 110 to prevent vibration caused by the disc tray 140, and disturbance and noise caused by internal vibration when the eccentric disc is driven. The damping device 150 includes first and second molded tension portions 151 and 152 formed integrally with both sidewalls 111 and 112 of the main chassis 110. First and second molded tension guide portions 153 and 154 are also formed integrally with the sub chassis 125 such that the mold tension guide portions 153 and 154 are placed at the bottom of the mold tension portions and supported thereon. One rubber damper 155 is mounted at the center of the rear portion of the pickup deck 121.

The first and second molded tension guide portions 153 and 154 of the sub chassis 125 are elastically supported by the mold tension portions 151 and 152 of the main chassis 110 at an upper position (at a chucking position of a disc) of the pickup deck 121. As the result, external impacts or internal vibrations are absorbed by the molded tension portions 151 and 152 and thus not transmitted to the pickup deck 121. Likewise, internal vibration or noise, produced at the time of the eccentric disc being driven, may also be reduced via the mold tension portions 151 and 152. In addition, the rubber damper 155 may not only be used as a hinge point to move the pickup deck 121 upward and downward, but may also serve to minimize an impact such as a deck impact which may be produced at the time of a vibration, such as a vibration fall test.

If the damping device 150 of this type does not efficiently absorb strong impacts, the impact is transferred to the pickup deck 121. As a result, a bent pickup deck 121 may result and damage the optical disc drive. Therefore, in addition to the damping device 150, an additional impact absorbing member 160 may be used. Hereinafter, the impact absorbing member 160 will be explained in detail.

The impact absorbing member, as shown in FIG. 2B, is molded at a front portion of the sub chassis 125 to form a hollow space therein. At both sidewalls 161 of the impact absorbing member 160, impact absorbing slots 162 are formed. Therefore, when a relatively strong impact is applied from the exterior, the impact may be absorbed due to the width of the slot 162. In addition, a plurality of ribs 165 are provided on the lower part of the impact absorbing member 160. Due to the stiffening ribs, 165 the impact absorbing member 160 may have constant rigidity. Consequently, the impact absorbing member 160 may prevent the pickup deck 121 from inadvertently moving on the main chassis 110. Moreover, two cam protrusions 163, which correspond to the cam slots 131, are formed at a front portion of the impact absorbing member 160. In this embodiment, the impact absorbing member 160 is formed integrally with the sub chassis 125. An additional elastic body may be attached to the sub chassis 125.

Hereinafter, the impact absorbing member 160 will be described with reference to FIGS. 4A and 4B.

Figure 4A:
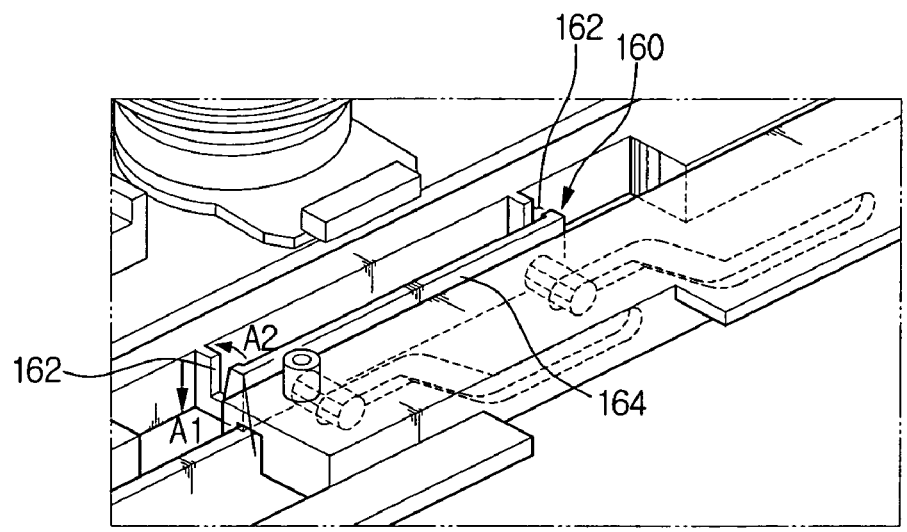
FIGS. 4A and 4B are perspective views of the impact absorbing member portion excerpted from FIG. 2A to explain an operation according to one embodiment of the present invention.

Referring first to FIG. 4A, the deck unit 120 (see FIG. 2A) may receive a strong impact due to the drop of the optical disc drive apparatus in a downward direction (in the direction of the arrow mark A1). When the deck unit 120 (see FIG. 2A) receives an impact in the downward direction, the front portion 164 of the impact absorbing member 160, which is fixed to the deck unit 120, deforms in the direction of the arrow mark A2. Accordingly, the impact absorbing slots 162 become narrower in width and thereby the impact is absorbed due to elastic force of the impact absorbing member 160.

Figure 4B:
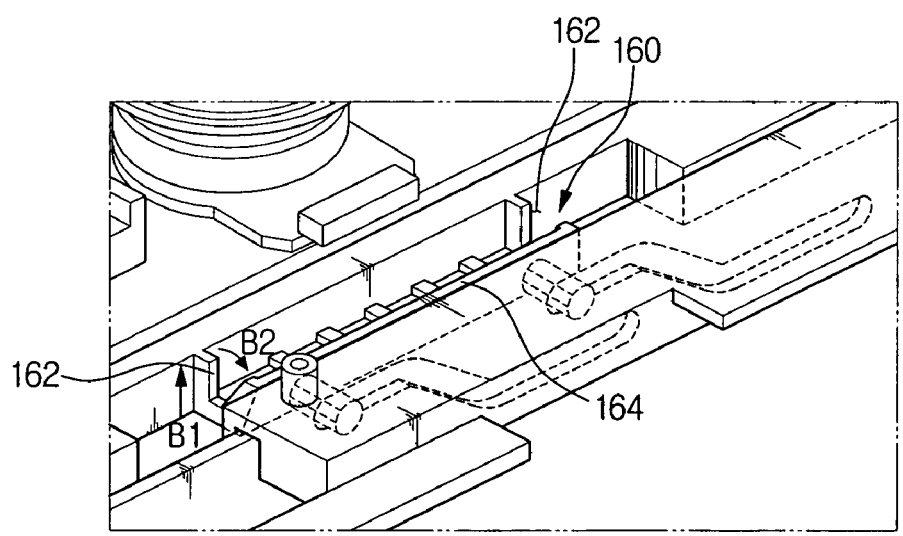

Referring to FIG. 4B, when the deck unit 120 (see FIG. 2A) receives an impact upward (in the direction of the arrow mark B1), the front portion 164 of the impact absorbing member 160 deforms in the direction of the arrow mark B2. Accordingly, the slots 162 for impact absorption become broader in width and thereby the impact is absorbed due to elastic force of the impact absorbing member 160. Next, the slots return to their original shape by the elastic force.

In this manner, even if a strong impact is applied to the deck unit 120, absorption of impact by the impact absorbing member 160 may prevent the deck unit 120 from bending. Further, even if an exceedingly strong impact is applied which the impact absorbing member 160 cannot stand, the deck unit 120 would keep a more stable state due to absorption of the impact via the impact absorbing member 160.

The mechanism of impact absorption was described with reference to FIGS. 4A and 4B illustrating the state in which the disc is loaded. However, even in a state in which the disc is not loaded, the mechanism of impact absorption of the above loaded state would be applied to that of the unloaded state.

As described above, according to an embodiment of the present invention, the deck unit may maintain a more stable state because the impact absorbing member absorbs an impact transferred to the deck unit having expensive optical pickup parts. Accordingly, impact resistance and reliability of the optical disc drive including a deck unit may be increased.

Moreover, instead of three rubber dampers as separate parts, the molded tension portions and the molded tension guide portions, respectively, are formed integrally with the main chassis and the sub chassis. Therefore, material cost reduction can be attained and contamination due to impurities such as sulfur produced from rubber dampers may be addressed.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical disc drive comprising:
   a main chassis;
   a deck unit mounted on the main chassis to move upward and downward;
   a slider movably arranged on the main chassis, the slider moving the deck unit upward and downward while moving on the main chassis; and
   an impact absorbing member interposed between the slider and the deck unit which absorbs an impact transmitted to the deck unit;
   wherein the deck unit comprises:
   a pickup deck including a turntable on which a disc is placed and a pickup which moves in a radial direction of the disc; and
   a sub chassis formed on a front portion of the pickup deck and including the impact absorbing member on a front portion of the sub chassis;
   the impact absorbing member is integrally formed with the sub chassis; and
   an impact absorbing slot is respectively formed in both sidewalls of the impact absorbing member.

2. The optical disc drive as set forth in claim 1, wherein at least one stiffening rib to reinforce rigidity is formed on a lower portion of the impact absorbing member.

3. The optical disc drive as set forth in claim 2, wherein at least one cam slot is formed on the slider and at least one cam protrusion corresponding to the cam slot is formed on a front portion of the impact absorbing member such that the deck unit is movable upward and downward, with the deck unit interlocking with the slider.

4. The optical disc drive as set forth in claim 3, further comprising:
   a damping device which absorbs vibrations caused between the main chassis and the pickup deck.

5. The optical disc drive as set forth in claim 4, wherein the damping device comprises:
   a pair of molded tension portions formed integrally with both side walls of the main chassis; and
   a pair of molded tension guide portions protruding from both sides of a front portion of the sub chassis such that the molded tension guide portions are placed at the bottom of the molded tension portions and supported thereon.

6. The optical disc drive as set forth in claim 5, wherein the damping device further comprises:
   a damping rubber mounted at the center of the rear portion of the pickup deck.

7. The optical disc drive as set forth in claim 6, further comprising:
   a disc tray mounted on the main chassis to slide in and out of the optical disc drive,
   wherein the slider moves on the main chassis which interlocks with the disc tray.

8. An optical disc drive comprising:
   a main chassis including at least two sidewalls;
   a deck unit mounted on the main chassis to move upward and downward;
   a slider movably arranged on the main chassis, the slider moving the deck unit upward and downward while moving on the main chassis;
   an impact absorbing member interposed between the slider and the deck unit which absorbs an impact transmitted to the deck unit; and
   a sub chassis including at least two sidewalls being formed on a front portion of the deck unit and including the impact absorbing member on a front portion of the sub chassis
   wherein the deck unit comprises a pickup deck including a turntable on which a disc is placed and a pickup which moves in a radial direction of the disc;
   the impact absorbing member is integrally formed with the sub chassis; and
   an impact absorbing slot is respectively formed in both sidewalls of the impact absorbing member.

9. The optical disc drive as set forth in claim 8, wherein at least one stiffening rib to reinforce rigidity is formed on a lower portion of the impact absorbing member.

10. The optical disc drive as set forth in claim 9, wherein at least one cam slot is formed on the slider and at least one cam protrusion corresponding to the cam slot is formed on a front portion of the impact absorbing member such that the deck unit is movable upward and downward, with the deck unit interlocking with the slider.

11. The optical disc drive as set forth in claim 10, further comprising:
 a damping device which absorbs vibrations caused between the main chassis and the pickup deck.

12. The optical disc drive as set forth in claim 11, wherein the damping device comprises:
 a pair of molded tension portions formed integrally with the side walls of the main chassis; and
 a pair of molded tension guide portions protruding from both sides of a front portion of the sub chassis such that the molded tension guide portions are placed at the bottom of the molded tension portions and supported thereon.

13. The optical disc drive as set forth in claim 12, wherein the damping device further comprises:
 a damping rubber mounted at the center of the rear portion of the pickup deck.

14. The optical disc drive as set forth in claim 13, further comprising:
 a disc tray mounted on the main chassis to slide in and out of the optical disc drive,
 wherein the slider moves on the main chassis which interlocks with the disc tray.

* * * * *